United States Patent [19]

Winzer

[11] 3,851,961

[45] Dec. 3, 1974

[54] LIGHT PROJECTION APPARATUS

[75] Inventor: Gerhard Winzer, Munich, Germany

[73] Assignee: Siemens Aktiengesellschaft, Berlin and Munich, Germany

[22] Filed: Apr. 3, 1972

[21] Appl. No.: 240,660

[30] Foreign Application Priority Data
Apr. 28, 1971 Germany.......................... 2120939

[52] U.S. Cl...................... 353/38, 353/69, 353/122
[51] Int. Cl. .......................................... G03b 21/14
[58] Field of Search ................. 353/31, 37, 38, 1, 2; 350/188

[56] References Cited
UNITED STATES PATENTS

| | | | |
|---|---|---|---|
| 3,337,287 | 8/1967 | Lessman | 353/69 |
| 3,338,131 | 8/1967 | Klein | 353/37 |
| 3,449,045 | 6/1969 | Roux | 353/31 |

FOREIGN PATENTS OR APPLICATIONS

| | | | |
|---|---|---|---|
| 653,914 | 5/1951 | Great Britain | 350/188 |
| 466,028 | 1/1969 | Switzerland | 350/188 |

Primary Examiner—Louis R. Prince
Assistant Examiner—A. J. Mirabito
Attorney, Agent, or Firm—Hill, Gross, Simpson, Van Santen, Steadman, Chiara & Simpson

[57] ABSTRACT

A coherent light projection apparatus comprises a coherent light which passes through a film means, a lens means, a light diffraction means and is projected onto a picture screen. The light diffraction means may have a non-uniform surface which by itself produces a distorted image and which when submerged into a liquid produces true image reproduction. The light diffraction means may also include a member having a contoured surface on one end which gradually changes over the length of the member to a planar surface at an opposite end whereby the member may be moved across the path of the light to quickly and simply vary the distortion of the projected image.

10 Claims, 4 Drawing Figures

LIGHT PROJECTION APPARATUS

BACKGROUND OF THE INVENTION

1. Field of the Invention

This invention generally relates to a coherent light projection apparatus and more particularly concerns a device for the distorted reproduction of object representations from film designs. Basically the device comprises one or more coherent light sources, a film means, a lens means, a light diffraction means and a picture screen. When the coherent light is projected through the elements of the combination onto a picture screen they appear very striking and pleasing to the eye of the viewer. The light diffraction means is such that light passing therethrough may be un-distorted or distorted so that great variations may be produced.

My invention may be used in many ways such as in the production of titles for films or, for example, for the production of striking designs and backgrounds for stage plays or for advertising purposes.

2. Description of the Prior Art

In the past methods have been used which produce distortion of an object reproduction by means of relatively complicated trick exposures. Moreover, these reproductions produced unimpressive images with incoherent light sources. Thus, according to the prior art the devices are inserted into the beam path of projectors which merely cause the image to become unclear or cause kaleidoscopic effects.

SUMMARY OF THE INVENTION

It is the object of this invention to provide a means for the reproduction of object images from film means wherein it is possible to vary the effect of the image from true reproduction to a distorted reproduction. According to my invention this object is met through the use of one or more coherent light sources which are arranged to have their emitted light pass through a series of projection elements such as a beam expanding device, a film means, a lens, and a structured member and be projected onto a picture screen.

I have found that if a structured member, that is, a member which may have a contoured light distorting surface or a planar surface which does not distort the light, is arranged in the path of a beam of coherent light, the coherent light may be diffracted to interfere with one another and thus produce a picture of dark and light stripes without producing any kind of regular structure. The light diffraction means or structured member may be movable in a direction along the beam of light and/or transverse to the beam of light whereby the object representation may be variable from a true representation to a distorted representation. In addition, the structured member may be rotated or tilted to distort the object representation. A plurality of structured members may be provided for the light to pass through so that particularly dramatic effects are obtained when these members are simultaneously moved relative to one another.

It is another feature of my invention that the light diffraction means may include a plurality of structured members each having an opposed, configured mating surface whereby when the structured members are spaced apart in predetermined relationship they will distort the light passing through them and whereby when the same members are moved together to produce a plane, parallel plate a distinct and true image will be projected.

The light diffraction means may also include a structured member having a variably configured surface so that as light passes through a first portion of the structured member a true image is produced whereas when light passes through a second portion of the structured member a distorted image is produced. An illustrated embodiment of this device may be seen to include an elongated member having a roughened or configured surface at one end and a smooth, planar surface at the other end with an area of gradual transition therebetween. In this case, as the structured member is moved across the path of the light from one end to the other, the projected image will be greatly varied.

Further dramatic effects may be produced with the apparatus of my invention when an immersion liquid having the same refractive index as the material of the structured member is provided adjacent to the structured member so that when the configured surface of the structured member, which by itself would produce a distorted image, is brought into contact with the immersion liquid and effectively submerged therein, a true, un-distorted image will be reproduced.

A plurality of coherent light sources may be arranged in generally parallel relationship to each other to produce generally parallel beams of light which beams of light may be deflected to pass along a single path by means of a plurality of partially permeable mirrors arranged in predetermined relationship to each other and to the coherent light sources.

BRIEF DESCRIPTION OF THE DRAWINGS

Other objects, features and advantages of the invention will be readily apparent from the following description of certain preferred embodiments thereof, taken in conjunction with the accompanying drawing, although variations and modifications may be effected without departing from the spirit and scope of the novel concepts of the disclosure and in which.

DESCRIPTION OF THE PREFERRED EMBODIMENT

Figure 1:
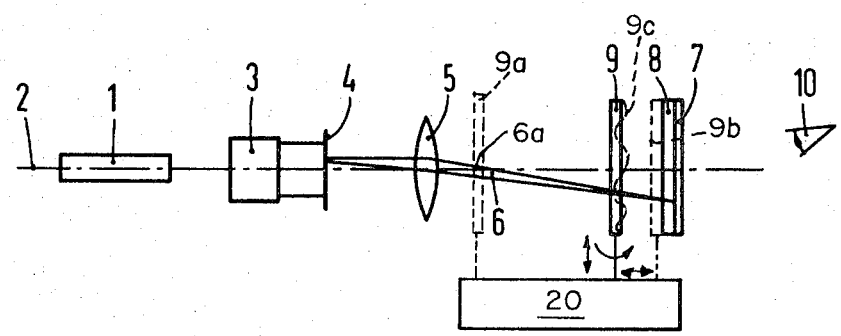
FIG. 1 is a schematic representation of one embodiment of my invention illustrating a coherent light source at the left passing through various elements of the combination to produce a projected image visible to the human eye schematically represented at the right.

Referring to the embodiment in FIG. 1 it may be seen that the light of a coherent light source 1, namely a laser beam producing means, proceeds along an optical axis 2 to a beam-expansion device 3 and from there through a slide means 4, through a lens means 5, and onto a picture screen 7. As shown, the film means 4 are distinctly reproduced on the picture screen 7 which may be a ground glass plate. In the preferred embodiment the lens means 5 is arranged so that an image of the film means 4 will be distinctly reproduced on the ground glass plate 7 as indicated by a ray of light 6 extending in schematic fashion from a point on the film means 4 to a point on the ground glass screen 7. The ray of light 6 has a focal point at 6a.

Between the focal point 6a and the picture screen 7 structured member 9 may be positioned to affect the path of travel of the light ray 6. The degree to which the light passing through the structured member will be effected depends basically upon the surface configuration of the structured member so that when the opposite sides of the structured member 9 are parallel, the light will pass therethrough relatively uniformly and present a true image when projected on the ground glass plate 7. On the other hand when the surface of the structured member 9 is contoured or roughened or otherwise uneven the coherent light beam will be diffracted when passing therethrough and the individual diffracted light beams will interfer with one another so that a scrambled image of light and dark lines in spots will be produced on the picture screen 7 whereby the image of the film means 4 will be unrecognizable on the screen 7.

I have found that a projection system must be capable of producing both true images and distorted images as well as to vary between these two extremes quickly and easily. One means for effecting this variation between a true and distorted image includes providing the structured member 9 with a contoured surface 9c on the side closest to the ground glass plate 7, providing an immersion liquid means 8 directly in front of the ground glass plate 7 so that the structured member 9 may be submerged into the immersion liquid 8 at least to the extent of the depth of the contoured side 9c. When the immersion liquid 8 has the same refractive index as the material of the structured member 9 and the roughened surface 9c of the structured member 9 is brought into contact with immersion liquid 8, the distortion caused by the roughened surface will be overcome and a true, undistorted image will be produced on the picture screen 7. Thus, it may be seen that as the structured member 9 is moved from a position shown in dotted lines at 9a where it is at the focal point 6a of the ray of light 6 to a position as shown in dotted lines in 9b where it is partially submerged in the immersion liquid 8, that the image on the film means 4 will move from a very distorted, unrecognizable projection on the screen 7 to a true representation when viewed by an observer schematically illustrated at 10. In practice it is therefore possible for a image to be initially projected in a true likeness but to have it subsequently fade out or changed to an unrecognizable image.

The structured member 9 is of course movable axially along the optical axis 2 between the positions 9a and 9b by an appropriate means schematically illustrated at 20. In addition, the member 9 may be rotated, twisted or tilted by means 20 to produce dynamic, dancing figures or flames or fire impressions. Furthermore, it is contemplated by my invention that a plurality of structured members may be arranged one behind the other and moved relative to each other to amplify and expand the range of effects which may be produced. Such effects are explained in greater detail in application Ser. No. 128,276 filed Mar. 26, 1971, which application issued on Sept. 4, 1973 as U.S. Pat. No. 3,757,106 and in which I am a joint inventor and in the prior art references cited thereagainst.

If the structured member 9 has a surface structure which has only a minor variation the emersion liquid 8 may be eliminated if the structured member 9 is moved directly against the ground glass plate 7 since this juxtapositioning will cause a relatively accurate image to be conveyed therethrough.

The same effects of course can also be produced when the immersion liquid 8 is not in direct contact with the ground glass plate 7, but is arranged somewhere between the latter and the structured member 9. In this instance it is merely necessary that the structured member 9 submerge into the immersion liquid 8 to the depth of its contour 9c to produce a true reproduction.

Figure 2:
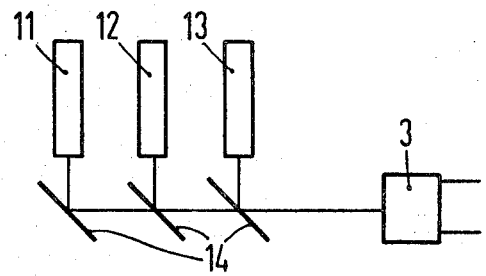
FIG. 2 is a schematic illustration of a plurality of coherent light sources arranged generally parallel with their beams of light being deflected to form a single beam by a plurality of partially permeable mirrors arranged in predetermined relationship.

While the beam from the laser 1 will be essentially monochromatic, it is possible to combine a plurality of laser beam light sources of different colors such as shown for example by the light sources 11, 12 and 13 in FIG. 2. In that case the laser light source 11, 12 and 13 may be of three different colors and may be positioned in three generally parallel planes so that by means of a plurality of partially permeable mirrors 14 arranged in predetermined relationship to each other and to the coherent light sources 11, 12 and 13 a multichromatic beam 20 may be made to enter the beam expansion device 3 and assume the paths as set forth with regard to FIG. 1. The beam expanding device 3 serves to expand the laser beam to provide a protection to onlookers 10 from possible radiation damage to their eyes.

While the structured member 9 has been shown with a contoured surface 9c in dotted lines on one side it is possible that it may be structured on both surfaces in which case the structured member 9 must be completely submerged in the liquid 8 to produce a true reproduction.

Figure 3:
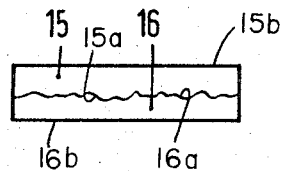
FIG. 3 is a schematic illustration of a pair of mating structured members which may be moved relative to each other to vary the light distortion.

In a further embodiment of my invention as shown in FIG. 3 the immersion liquid is not required. Rather a structured member 15 having a contoured surface 15a may be provided with another structured member 16 having an opposed, mating, complementary surface 16a. The members 15 and 16 will have planar surfaces 15b and 16b respectively opposite the surfaces 15a and 16a so that when the structured members 15 and 16 are placed in a beam of light as would be understood if they were substituted for the structured member 9 in FIG. 1, a true image will pass therethrough to the picture screen 7 when the members 15 and 16 are in mating relationship as shown. However, when the members 15 and 16 are somehow moved with respect to each other a diffraction of the light passing therethrough will occur. Thus, for example, the members 15 and 16 may be moved apart and be rotated with respect to each other to produce a distorted light at the picture screen 7. It will be understood then that the image produced at the screen 7 after passing through the structured members 15 and 16 may be quickly and readily varied from a true image to a distorted image and vice versa. If the opposed surfaces 15a and 16a are not exactly mating with each other a thin immersion film may be applied between the surfaces to compensate for the irregularities and allow the passage of undistorted light rays.

Figure 4:
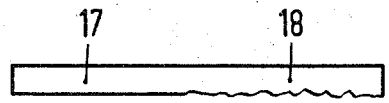
FIG. 4 is a schematic illustration of an elongated structured member having a planar configuration at one end which will not distort the light and a configured or roughened surface at the other and which will greatly distort the light passing therethrough.

A further embodiment of my invention which allows the variation of the projected image may be seen in FIG. 4 to include an elongated member having a first portion 17 with parallel sides whereby a true image is reproduced and a second portion 18 having a structured and contoured surface whereby light passing therethrough is distorted. It is comtemplated that the portion of the elongated member between the portion 17 and 18 have an area of gradual transition between smooth and rough so that as the structured member is moved across the path of the light from the portion 17 to 18 and vice versa the projected image will be greatly varied. For a distinct and true reproduction of the image and the film means 4 the left portion 17 is inserted into the path of the beam and where it is desired that the image be distorted the right part is inserted into its path. Since the structure on the surface of a member steadily decreases from right to left a steady transition between a distorted image and a true reproduction will be obtained when the structured member is passed through the beam from right to left.

Many changes and modifications may be made in the invention by one skilled in the art without departing from the spirit and scope of the invention, and it is to be understood that I intend to include within the patent warranted hereon all such changes and modifications as may reasonably and properly be included within the scope of my contribution to the art.

I claim:

1. An apparatus for selectively projecting an undistorted and distorted image having interference lines on a screen comprising a screen, at least one source of coherent light for projecting a beam of coherent light onto the screen, a film means disposed in the beam of light to impose an image thereto, lens means for focusing the beam of light containing the imposed image onto the screen, and means arranged between the lens means and screen for selectively diffracting the beam of coherent light to selectively create on the screen a distorted image having lines and contours exhibiting interference lines.

2. An apparatus according to claim 1, wherein the means for selectively diffracting includes a structured member having at least one portion with at least one contoured surface, and means for moving the structured member between a first position causing diffraction of the coherent beam passing through the one portion to provide a distorted image and a second position enabling a true image to be projected on the screen.

3. An apparatus according to claim 2, wherein the means for moving the structured member moves the structured member in a direction extending parallel to the axis of the coherent beam of light.

4. An apparatus according to claim 2, wherein the means for moving the structured member includes means for varying the orientation of the structured member relative to the beam axis to cause movement of the distorted image on the screen.

5. An apparatus according to claim 2, wherein the structured member has a second portion with parallel plane surfaces adjacent the one portion and wherein the means for moving moves the structured member in a direction transverse to the axis of the beam of coherent light between the first position with the beam passing through the one portion to create a distorted image on the screen and the second position with the beam passing through the second portion to enable a true image to be projected onto the screen.

6. An apparatus according to claim 1, wherein the means for selectively diffracting includes a pair of structured members with each member having a planar surface and an opposite configured surface, said pair of members being arranged with the configured surface in facing relationship and generally mating, and wherein said means for selectively diffracting includes means for moving the pair of structured members between a first position spaced apart in a predetermined relationship to each other to cause distortion in the beam of coherent light passing therethrough to a second position with the configured surfaces engaging each other to present a composite plate having parallel plane surfaces to allow the beam to pass therethrough undistorted.

7. An apparatus according to claim 6, wherein the means for diffracting further includes means for providing a fluid having generally the same refractive index as the structured members, said fluid being disposed between the two mating surfaces to compensate for any irregularities when the members are in the second position to enable light to pass therethrough with a minimum amount of distortion.

8. An apparatus according to claim 1, wherein the means for selectively diffracting includes a structured member disposed in the beam of coherent light and having at least one contoured surface, immersion liquid disposed in the path of the beam of coherent light, and means for moving the structured member along the axis of the beam of coherent light from a first position with at least the contoured surface submerged in the immersion liquid to a second position axially spaced from the immersion liquid so that when the structured member is in the first position, the beam of coherent light passing therethrough is undistorted and provides a true image on the screen and when the structured member is in the second position the beam of coherent light is diffracted to cause distortions in the image projected on the screen.

9. An apparatus according to claim 8, which includes a plurality of coherent light sources providing a plurality of beams of coherent light, a partially permeable mirror associated with each of said beams with the mirrors of each beam being arranged to reflect the coherent beam from each source along a single axis to produce a multi-coherent beam of light passing through the film means.

10. An apparatus according to claim 1, which includes a plurality of coherent light sources providing a plurality of beams of coherent light, a partially permeable mirror associated with each of said beams with the mirrors of each beam being arranged to reflect the coherent beam from each source along a single axis to produce a multi-coherent beam of light passing through the film means.

* * * * *